Sept. 3, 1968   H. K. S. P. BEGEMANN   3,399,737
ELONGATED OBJECT ADAPTED TO BE DRIVEN INTO A RESISTANT
MEDIUM SUCH AS SOIL AND A METHOD FOR FACILITATING
THE DRIVING IN OF SUCH AN OBJECT
Filed June 21, 1966
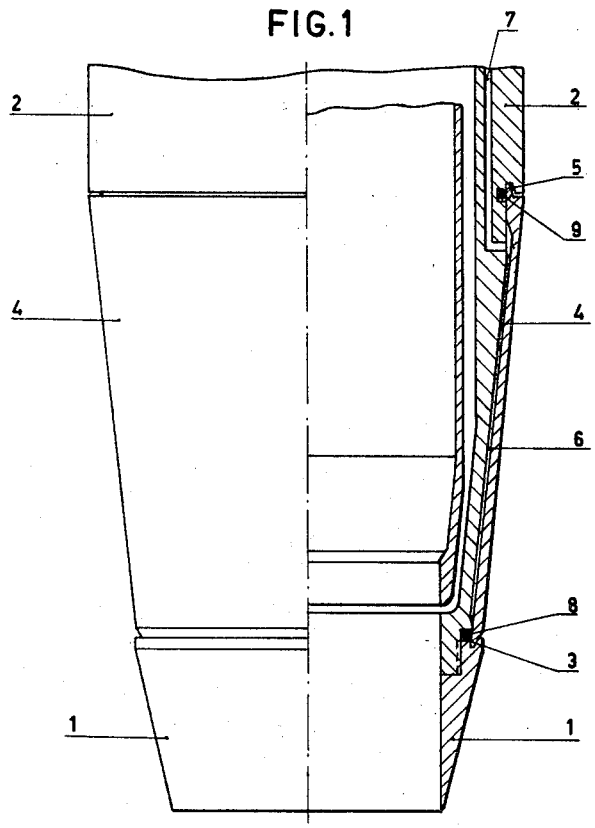
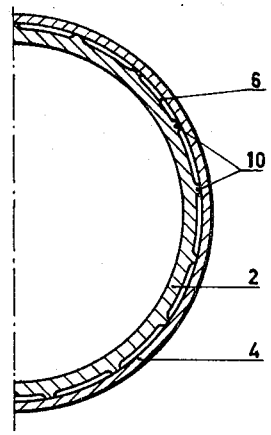
INVENTOR.
HEINRICH KARL SIMON PHILIP BEGEMANN
BY
Hammond and Littell
ATTORNEYS

United States Patent Office 3,399,737
Patented Sept. 3, 1968

3,399,737
ELONGATED OBJECT ADAPTED TO BE DRIVEN INTO A RESISTANT MEDIUM SUCH AS SOIL AND A METHOD FOR FACILITATING THE DRIVING IN OF SUCH AN OBJECT
Heinrich Karl Simon Philip Begemann, The Hague, Netherlands, assignor to Stichting Waterbouwkundig Laboratorium, Delft, Netherlands, a corporation of the Netherlands
Filed June 21, 1966, Ser. No. 559,218
Claims priority, application Netherlands, June 23, 1965, 6508087
6 Claims. (Cl. 175—19)

ABSTRACT OF THE DISCLOSURE

This invention relates to an elongated object adapted to be driven into a resistant medium, said elongated object having a cylindrical mantle section with a conical end part, said conical end part having at least one truncated conical mantle part comprising an elastic annular membrane, a fluid space recessed into said mantle part behind said elastic membrane and means to intermittently impress a fluid pressure in said fluid space as well as the method for driving said object into the resistant medium.

The prior art

For driving in elongated objects use is made of a driving device supplying a constant or a varying driving force on the object in the direction of driving. This force overcomes the resistance of the medium and displaces the object slowly or faster. The resistance is chiefly determined by the properties of the medium, but also by the largeness of the area on which the force works. The resistance is built up by the point resistance which the end part of the object meets from the medium and by the friction or the adhesion exerted by the medium on the mantle surface of the object. The transverse cross-section and the end surface of the object are constant, but the mantle surface increases in a linear way with the length which the object has been driven into the medium.

The driving force required in the driving device to overcome the total resistance generally increases with the depth to which the object has been driven, but is limited by the capacity of the driving device. The capacity of the latter may of course be increased, for instance by loading the device with ballast or by anchoring it in the medium, but here too there are set limitations. For this reason, it is impossible to drive an object beyond a certain determined depth while using the conventional driving device, whether a hydraulic, a pneumatical or a mechanical one.

Objects of the invention

It is the object of the present invention to provide a method which will make it possible to drive in an elongated object into the medium to a much greater depth while using the conventional driving device, by the application of very simple means.

The drawings

FIG. 1 is a plan view of the lower part of the elongated object of the invention, partly in cross-section.

FIG. 2 is a cross-section of the lower part of the elongated object of the invention.

Description of the invention

The above object is achieved and the disadvantages of the prior art are overcome according to the invention which comprises an elongated object adapted to be driven into a resistant medium, said elongated object having a cylindrical mantle section with a conical end part, said conical end part having at least one truncated conical mantle part comprising an elastic annular membrane, a fluid space recessed into said mantle part behind said elastic membrane and means to intermittently impress a fluid pressure in said fluid space.

For this purpose, the object according to this invention is provided with at least one truncated conical mantle section near its end part, the said mantle part consisting mainly of an elastic annular truncated conical membrane, behind which a space filled with fluid has been recessed into this mantle part, said space being connected by means of one or more channels to a pressure source, adapted to bring about relatively fast periodical volume displacements of the fluid. Preferably, this pressure source is mounted outside the object and outside the medium, but it may be of advantage to accommodate the pressure source inside the object itself.

When the object according to the invention is driven into the medium with a conventional driving device, the pressure source is put into operation according to the invention, causing the fluid to be displaced backwards and forwards through the channels, whilst the membrane is expanded and reverts to its original form periodically. Consequential to the said expansion, the medium is pushed away mainly in lateral direction. When the fluid flows back, the membrane, owing to its elastic properties, resumes its original dimensions, leaving a recess in the surrounding medium around the conical part.

The object is then moved down under the influence of the driving force in accordance with the direction of the said driving force, because the contact surface with the medium determined by the elastic membrane at that moment hardly meets with any resistance from the medium. Preferably, the annular membrane is situated with its largest diameter adjoining the outer periphery of the mantle of the object, so that the projection of the elastic membrane surface on the transverse cross-section is maximal with respect to the total transverse cross-section of the object. At the moment the fluid flows back, the point resistance on the front surface shows its maximum of reduction. When there is a fresh supply of the fluid, the membrane expands again and when it flows back the object is again moved in the driving direction. The distance, over which the object is displaced, is determined on the one hand by the expansion the membrane will stand in dependency on the material properties especially the elasticity limit, and on the other hand by the conicity. The angle of inclination of the conical membrane with respect to the centre line of the object should be chosen in such a way that the expansion of the membane causes a mainly lateral displacement of the medium. In proportion as the angle of inclination is smaller it will be possible for the movement of the object in the direction of the driving force to be larger after each expansion, but this is limited by the size of the conical mantle surface projected on the transverse cross-section with respect to the total transverse cross-section of the object. It is important that the expansion caused by the supply of the fluid behind the membrane should be distributed as evenly as possible over the periphery of the membrane, because otherwise deviations from the driving direction may occur.

When the end part of the object does not consist of one single cone or truncated cone, but consists of a number of conical shoulders separated by cylindrical sections, so that a stepped end part is the result, each of the conical sections may be provided with an elastic membrane. In that case it is desirable that the volume variations behind the membranes should occur simultaneously and with a view hereto it is preferred for those spaces not to be linked among themselves, but each to be provided separately with a channel leading to the pressure source. This opens up the possibility of adjusting the expansion of each separate membrane to its own size and its own conicity, so that the possible displacement in the driving direction has the same value for each step.

Besides conical mantle sections containing elastic membranes, there may be provided in the cylindrical mantle surface of the object one or more cylindrical elastic membranes, which, by means of volume displacements of the fluid present in spaces in the object behind the membranes, cause periodical widenings of the cylindrical cavity in the medium in which the object is situated and consequentially bring about a lessening of the medium's adhesion to the object. Preferably, the expansion of the cylindrical membranes occurs simultaneously with that of the conical membranes. When the fluid flows back and the expansion contracts, both the point resistance and the adhesion are diminished, so that the driving force meets with less resistance and the object is more easily displaced in the driving direction.

This invention is specially important for those elongated objects which have to meet high requirements as to driving capacity. As an example we may mention apparatus provided with sensitive instruments for determining the properties of the medium and cutting apparatus for taking undamaged soil samples, in which all the influences of the driving of the cutter on the sample to be taken should be avoided as much as possible.

It should be clear that, instead of a conical and cylindrical shape, other shapes given to the end part of the object, such as a pyramid, either truncated or not, and a square of rectangular transverse cross-section with or without rounded ribs, also fall within the scope of this invention.

The invention is described hereinafter with reference to an embodiment of an object according to the invention, only part of a soil sample cutter being shown in the drawing in this case; the lower extremity of the object is shown in FIGURE 1, partly in longitudinal cross-section and partly in front view. FIGURE 2 shows part of a transverse cross-section of the same cutter.

The soil sample cutter is provided with a cutter head 1, which is screwed on the mantle 2 of the cutter. The upper edge of the cutter head 1 is provided with an annular groove 3, in which is supported a conical annular elastic membrane 4. Near the end of the more elevated cylindrical section of the mantle 2 there is provided a second annular groove 5, in which is supported the upper end of the elastic membrane 4, so that the outer surface of the conical membrane fits on to the outer surface of the cylindrical section. Behind the membrane 4 there is recessed a space 6 into the mantle 2, the said space being connected to a pressure source for a fluid, not shown in the drawing, by means of one or more channels 7.

Behind the annular grooves 3 and 5 in the mantle 2 there are provided in suitable annular packing spaces O-rings 8 and 9, which prevent the fluid from leaking away from the space 6 along the seams between mantle 2 and elastic membrane 4.

The O-rings are necessary, because when the membrane 4 expands, a slight movement in the longitudinal direction of the mantle is possible. The space 6 can be made as a purely conical cavity between the outer wall of the mantle at that location and the inner wall of the membrane 4. Preferably, the space 6 is divided into smaller sections by means of ridges 10 on the mantle as shown in the drawing or by elevations on the inner wall of the membranes 4, which smaller sections should all intercommunicate, in order to achieve an expansion that is evenly distributed over the annular circumference.

In the normal position, the ridges 10 support the elastic membrane and prevent the pressure exerted by the soil on the membrane 4 from reducing the spaces 6 in such a way that the fluid is pressed out of them or that the membrane is damaged. The distance of the ridges 10 behind the membrane 4 is further dimensioned in accordance with the desired possibility of expansion to which it is allowed to react elastically only within the limits of its dimensions.

Preferably, the pressure source is formed by a simple piston which is operated by hand or by a motor, and which moves a cylinder connected with the space or spaces 6 by means of a conduit connected to a channel 7, so that the piston moves the fluid backwards and forwards.

It is also possible to connect the channel 7 to a hydraulic plant which supplies the driving force for the object, but when such a construction is used, care should be taken that the pulsating volume displacements of the fluid can be initiated or stopped at any given moment of the driving-in operation.

If the object is either a solid or a hollow pole or a caisson construction which is to remain in the soil, it may be of advantage to have the pulsating volume displacement with lateral effect occur in positive relationship with a pulsating driving force in longitudinal direction, which will encourage a more speedy sinking. Preferably, one single incompressible liquid is used from pressure source to membrane, but other systems are possible. As a matter of fact it is possible to accommodate such a liquid in the object in a closed system and for pulsating purposes to employ one or more cylinders situated in the object and provided with plungers, which are driven by a motor or by a second fluid such as air, which is supplied under a lower pressure from outside the object by a compressor and which drives the plunger in the manner of a percussive hammer. In this case the compressor may be coupled to the usual above ground driving installation.

The angle of inclination of the conical annular membrane with respect to the centre line of the object should preferably be less than 45° in order to achieve an effective operation in lateral direction and preferably much less. When the angle is larger than 45°, the expansion in axial direction will dominate, so that the possible sinking into the soil is considerably reduced and the soil which is present under the object may be deformed in an impermissible way.

Preferably, there are no valves provided in the pressure source or in the channels, because these may give rise to an accumulation of volume displacements and hamper the reflux of the fluid, which may cause the effect of the method to be lost.

I claim:

1. An elongated object adapted to be driven into a resistant medium, said elongated object having a cylindrical mantle section with a conical end part, said conical end part having at least one truncated conical mantle part comprising an elastic annular membrane, a fluid space recessed into said mantle part behind said elastic membrane and means to intermittently impress fluid pressure in said fluid space.

2. The elongated object of claim 1 wherein the angle of inclination of said at least one truncated conical mantle part with respect to the center line of said elongated object in such that expansion of said elastic annular membrane is mainly lateral.

3. The elongated object of claim 1 wherein the angle of inclination of said at least one truncated conical mantle part with respect to the center line of said elongated object is less than 45°.

4. The elongated object of claim 1 wherein the largest diameter of said elastic annular membrane adjoins said cylindrical mantle section.

5. An elongated object adapted to be driven into a resistant medium, said elongated object having a cylindrical mantle section with a stepped end part, said stepped end part having a number of conical shoulders separated by cylindrical sections, each of said conical shoulders comprising an elastic annular membrane, a fluid space recessed into said conical shoulder behind said elastic membrane and means to intermittently impress a fluid pressure in said fluid space, each of said means to intermittently impress a fluid pressure comprising separate channels to each of said fluid spaces and means to simultaneously apply equal fluid pressure to each of said fluid spaces.

6. A method of facilitating the driving of an elongated object having a conical end part into a resistant medium which comprises the step of periodically effecting a displacement of said resistant medium away from said conical end part of said elongated object and simultaneously, during the period when said displacement is not effected, driving said elongated body into said resistant medium.

References Cited

UNITED STATES PATENTS

| 2,871,943 | 2/1959 | Bodine | 166—177 X |
| 3,164,964 | 1/1965 | Josephson | 175—19 |
| 3,187,513 | 6/1965 | Guild | 175—19 X |
| 3,261,412 | 7/1966 | Lob | 175—22 |

NILE C. BYERS, Jr., *Primary Examiner.*